United States Patent [19]

Aldred

[11] Patent Number: 5,296,914
[45] Date of Patent: Mar. 22, 1994

[54] ELECTRO-OPTICAL MEASUREMENT AND FOCUSING APPARATUS

[75] Inventor: Philip J. E. Aldred, Shrewsbury, United Kingdom

[73] Assignee: Tesa Metrology Limited, Telford, United Kingdom

[21] Appl. No.: 862,073

[22] Filed: Apr. 2, 1992

[30] Foreign Application Priority Data

Apr. 4, 1991 [GB] United Kingdom ............... 9107037

[51] Int. Cl.⁵ .................. G01B 11/04; G01B 11/10
[52] U.S. Cl. .................................. 356/385; 250/560
[58] Field of Search ............... 356/375, 381, 384, 385, 356/386, 387; 250/560, 561

[56] References Cited

U.S. PATENT DOCUMENTS

| | | | |
|---|---|---|---|
| 3,734,620 | 5/1973 | Cade | 356/73 |
| 3,737,237 | 6/1973 | Zurasky | |
| 3,749,500 | 7/1973 | Carlson et al. | 356/156 |
| 3,856,412 | 12/1974 | Zanoni | 250/560 |
| 4,043,673 | 8/1977 | Harris et al. | 250/560 |
| 4,061,427 | 12/1977 | Fletcher et al. | 250/571 |
| 4,068,955 | 1/1978 | Bodlaj | 250/560 |
| 4,182,259 | 1/1980 | Garner et al. | 118/712 |
| 4,390,278 | 6/1983 | Inoue | 356/392 |
| 4,498,778 | 2/1985 | White | 356/376 |
| 4,521,112 | 6/1985 | Kuwabara | 356/387 |
| 4,747,689 | 5/1988 | Aldred | 356/385 |
| 4,753,532 | 6/1988 | Aldred | 356/384 |

FOREIGN PATENT DOCUMENTS

| | | |
|---|---|---|
| 0029748 | 11/1980 | European Pat. Off. . |
| 0215656 | 12/1986 | European Pat. Off. . |
| 0216587 | 12/1986 | European Pat. Off. . |
| 60-249006 | 12/1985 | Japan . |
| 62-287109 | 12/1987 | Japan . |
| 2058344 | 9/1980 | United Kingdom . |
| 2078945 | 6/1981 | United Kingdom . |
| 2136954 | 9/1984 | United Kingdom . |
| 2180337 | 9/1985 | United Kingdom . |

*Primary Examiner*—F. L. Evans
*Attorney, Agent, or Firm*—Baker & Daniels

[57] ABSTRACT

The disclosure relates to an electro-optical measurement apparatus comprising, a measurement station, a light source on one side of the measurement station and means to direct a beam of collimated light from the light source along an optical path through the measurement station. Photo-detector arrays are disposed in the optical path from the measurement station, and an object to be measured is located at the measurement station in said optical path to block part of the light beam from the light source leaving transmitted portions of the beam to reach and activate corresponding sections of said arrays. Dimension of the part of the object in the optical path are derived from the resulting activation of the array means. A screen is provided together with means to divide the beam of light received from the measurement station between the arrays and the screen and means are provided for focussing the divided portion of the light beam onto the screen to produce an image of the part of the object being measured on the screen prior to, during or after measurement.

11 Claims, 11 Drawing Sheets

REFLECTING STOP ON GLASS PLATE

LIGHT PARALLEL TO OPTICAL AXIS IS REFLECTED TOWARDS THE CCD SENSOR.

LIGHT NOT PARALLEL TO OPTICAL AXIS PASSES THROUGH GLASS PLATE TO THE SCREEN.

PROJECTOR LENS  CONDENSOR LENS

FILAMENT (END VIEW)

PLAN VIEW.

FILAMENT IMAGE

FILAMENT (SIDE VIEW)

ELEVATION.

GEOMETRY OF REFLECTING STOP

ELECTRO-OPTICAL MEASUREMENT AND FOCUSING APPARATUS

BACKGROUND TO THE INVENTION

1. Field of the invention

This invention relates to electro-optical measurement apparatus for dimensional measurement of a wide range of components.

2. Background prior art

U.S. Pat. No. 4,747,689 discloses a computer controlled optical measurement apparatus for determining a plurality of dimensions of an object at linearly spaced locations on the object, comprising a measurement station for measurement of a linear dimension of the object, means to move the object through the measurement station to present the locations to be measured one by one, a light source on one side of the measurement station to direct a beam of light at the location of the object in the measuring station transversely to the required line of measurement and to the path of movement of the object through the station, elongate photo-electric array means disposed on the opposite side of the measurement station to the light source and lens means to focus an image of the part of the object to be measured on the photo-electric array means to form an image thereon of said part of the object. An elongate measurement graticule is provided on which a scale is delineated and means are provided for directing collimated light through the graticule and thence into the lens system to be focused on to the photo-electric array means whether or not an object is present in the apparatus for calibration of the array means prior to or during a cycle of measurement of an object. The computer may be provided with a visual display unit on which an image of an object being measured may be created indicating the measurements being taken. The image of the object shown on the V.D.U. is of limited benefit to the operator in assessing that the measurement operation is proceeding correctly and that there is no foreign body present on the object which might affect the correct measurement of the object.

SUMMARY OF THE INVENTION

The invention provides an electro-optical measurement apparatus comprising, a measurement station, a light source on one side of the measurement station, means to direct a beam of collimated light from the light source along an optical path through the measurement station, photo-detector array means disposed in the optical path from the measurement station, means to support an object to be measured at the measurement station in said optical path to block part of the light beam from the light source leaving transmitted portions of the beam to reach and activate corresponding sections of said array means, means to derive dimensions of the object in the optical path from the resulting activation of the array means, a screen, means to divide the beam of light received from the measurement station between the array means and the screen and means for focussing the divided portion of the light beam onto the screen to produce an image of the part of the object being measured on the screen as it is measured.

Preferably the means to divide the beam of light from the measurement station may comprise reflecting stop means in the optical path from the measurement station to direct light onto said photo-detector array means, means being provided for focussing parallel light received from the measurement station onto said reflecting stop means and means being provided for focussing non-parallel light from the measurement station which passes outside said reflecting stop means onto the screen.

By way of example, the reflecting stop may be mounted on a glass plate disposed in the optical path from the measurement station and at an angle to the path to reflect light focussed onto said stop onto the array means and to pass non-parallel light from the measurement station to said means to focus the light onto the screen.

Alternatively the reflecting stop may comprise a reflecting mirror having an aperture to which parallel light from the measurement station is directed to pass through the mirror to said photo-electric array means, non-parallel light being reflected by the mirror to said means to focus the light on to the screen.

In any of the above arrangements said photo-electric array means comprise one or more elongate arrays each comprising a multiplicity of photo-electric devices arranged to receive respectively said transmitted portions of the beam of light from said beam directing means.

More specifically two elongate arrays may be provided one of which is arranged to receive part of the beam of light from the reflective stop directly and a further reflector is provided to reflect the remainder of the beam onto the other array.

In one particular arrangement according to the invention the elongate arrays may extend at a small angle to the normal to the component axis as aligned along the arrays to provide rapid edge measurement.

In any of the above arrangements the means to focus said beam of light onto the screen may be arranged to focus a magnified image of the portion of the object being measured in the measuring station onto the screen.

In a preferred arrangement the screen may be provided with a marking or markings to enable the position of the object in the measurement station as seen on the screen to be checked for cleanliness and adjusted for focus.

According to a further feature of the invention said light source may comprise a bulb mounted in an adjustable jig which can be pre-set to locate the bulb automatically in the correct focussed position.

In any of the above arrangements the means to support a component to be measured in the measurement station may comprise a carriage for the component mounted on a slideway for movement of the carriage transversely of the optical path from said light source and means are provided for traversing the carriage along the slideway to move the component to be measured through the measuring station to allow measurements to be taken at a plurality of locations along the length of the component.

The following is a description of a specific embodiment of the invention, reference being made to the accompanying drawings.

DESCRIPTION OF THE PREFERRED EMBODIMENTS

Figure 1:
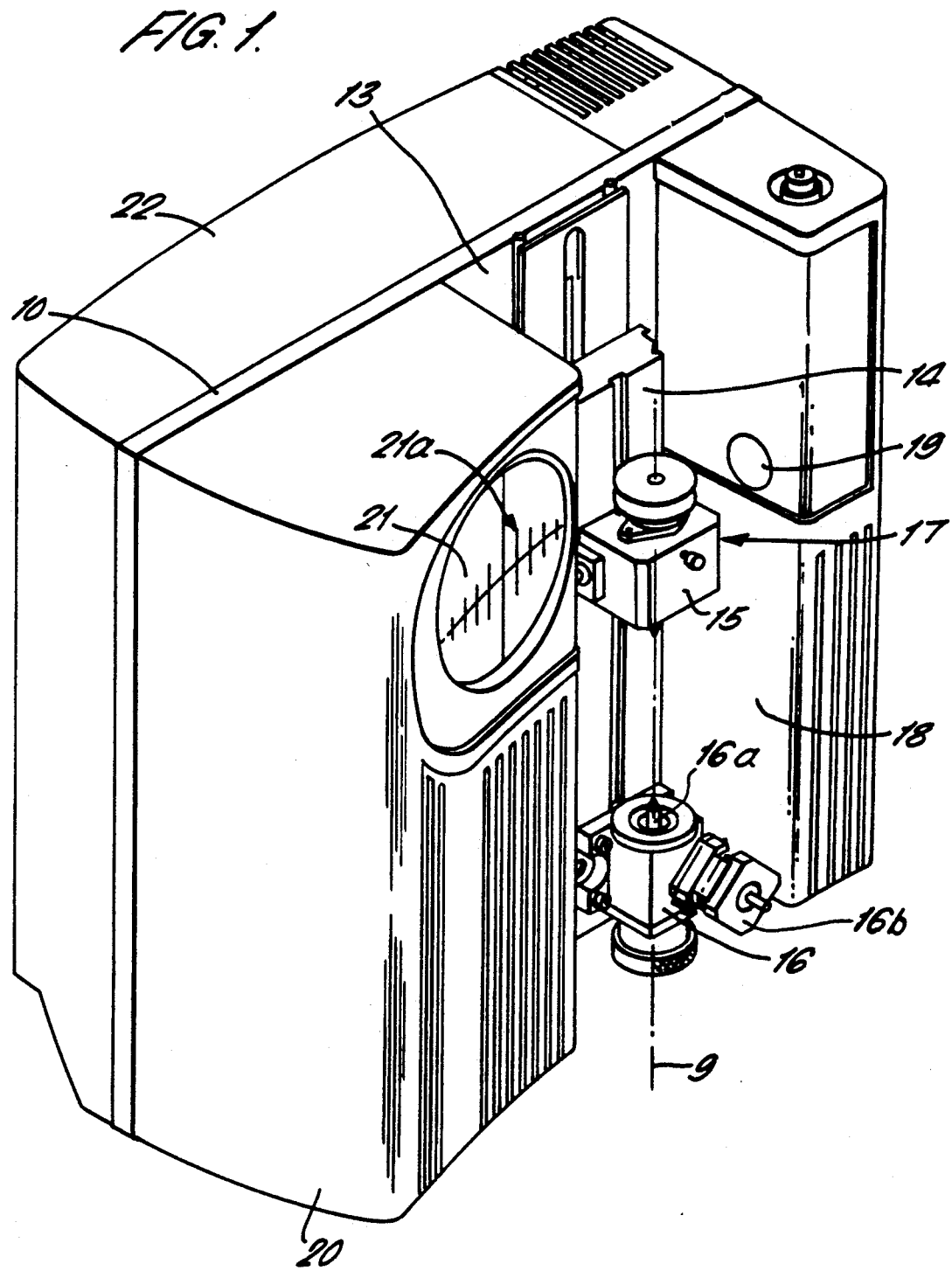
FIG. 1 is a perspective view of an electro-optical measurement device in accordance with the invention consisting of an upright base plate having a vertically moving component carrying carriage on the front side of the base plate with front housings to either side thereof enclosing components of the measurement system and a rear housing enclosing further components of the system mounted on the rearward side of the base plate.

Referring firstly to FIG. 1 of the drawings, there is shown an electro-optical measurement device in the form of a programmable, non-contact, bench top instrument for the measurement of components which may be up to, say, 30 mm in diameter and up to 200 mm in length.

Figure 2:
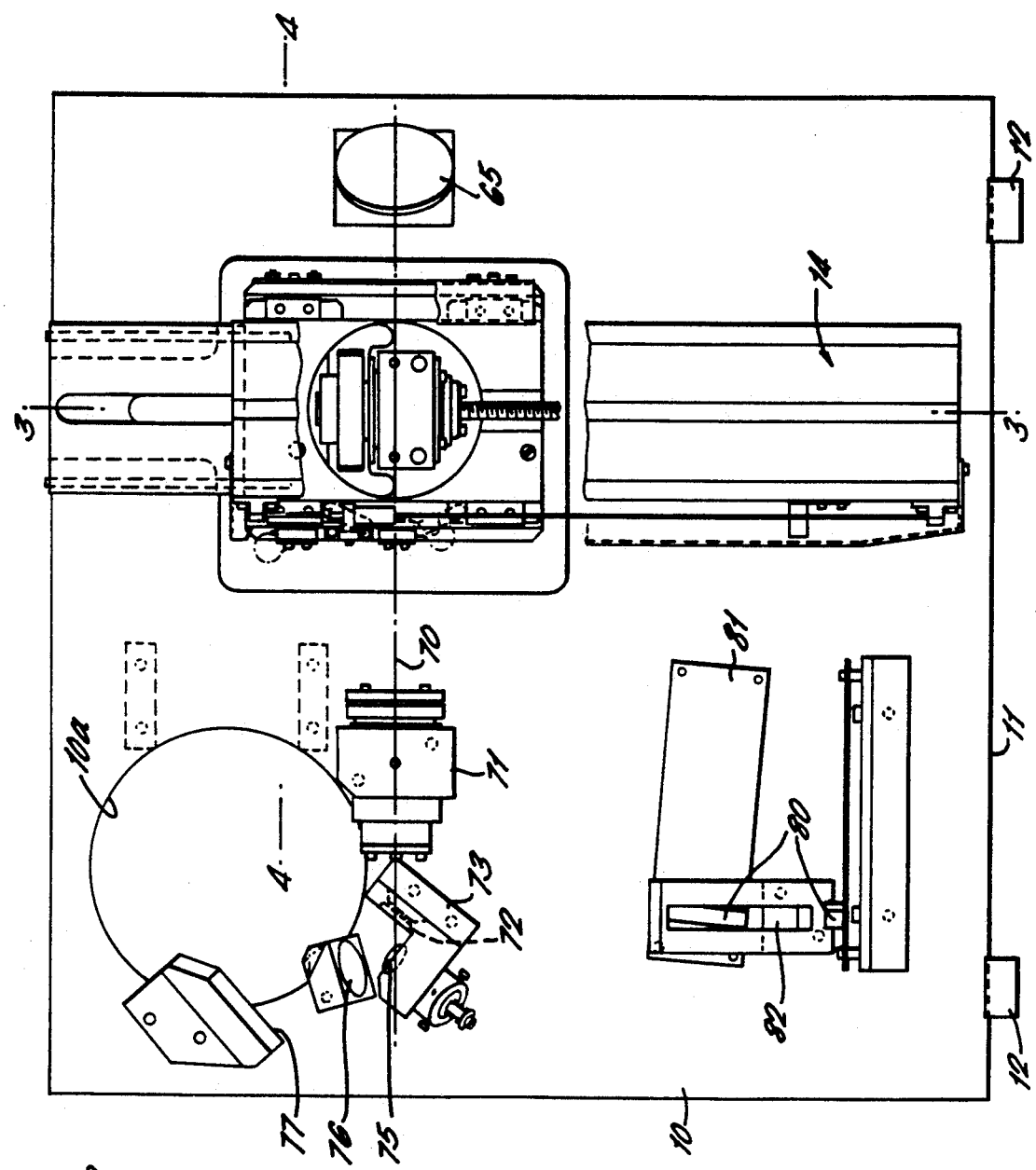
FIG. 2 is a front elevation view of the base plate with the front housings removed to reveal the measurement system components enclosed therein.
Figure 3:
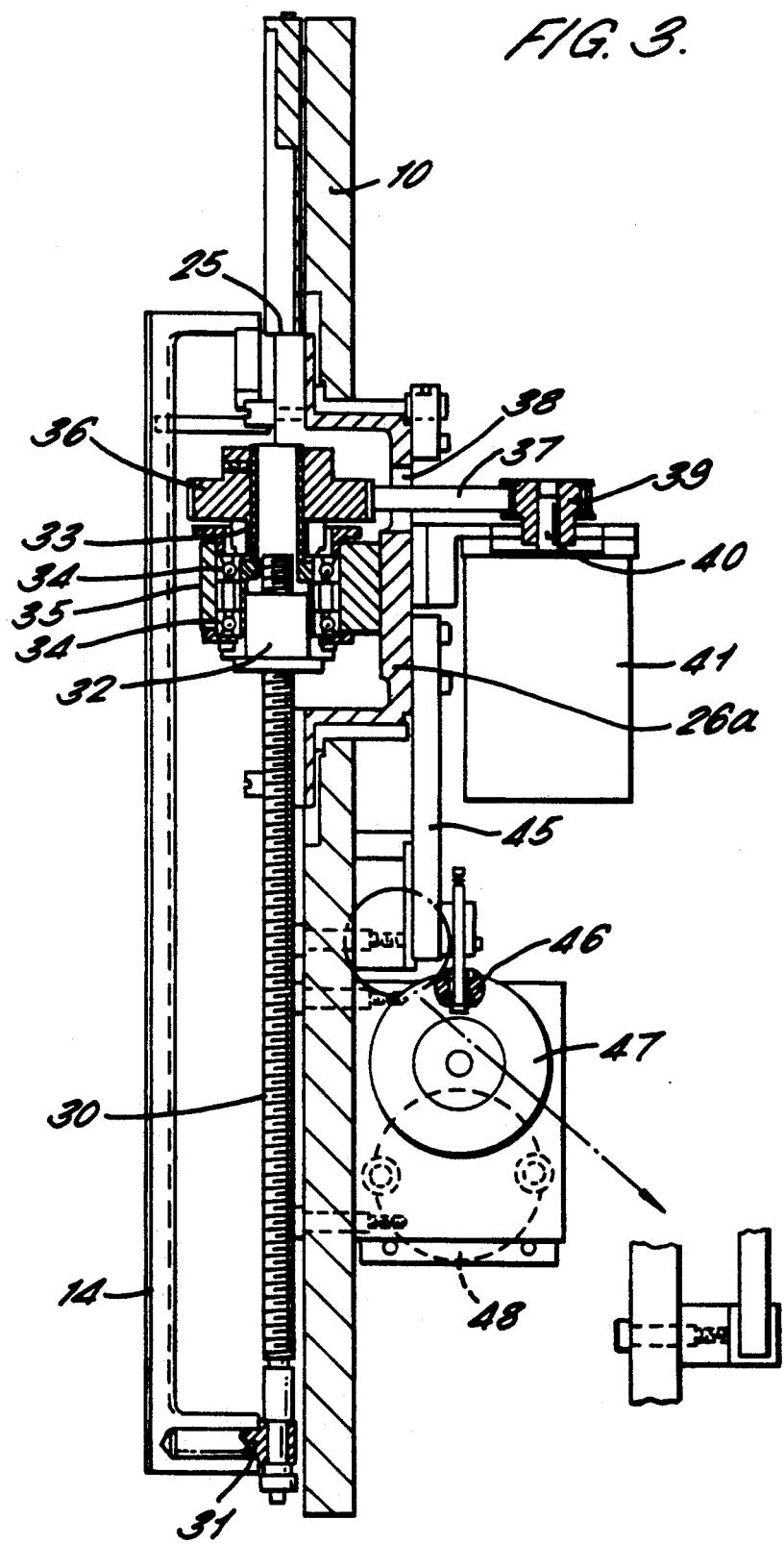
FIG. 3 is a section on the line 3—3 on FIG. 2.
Figure 4:
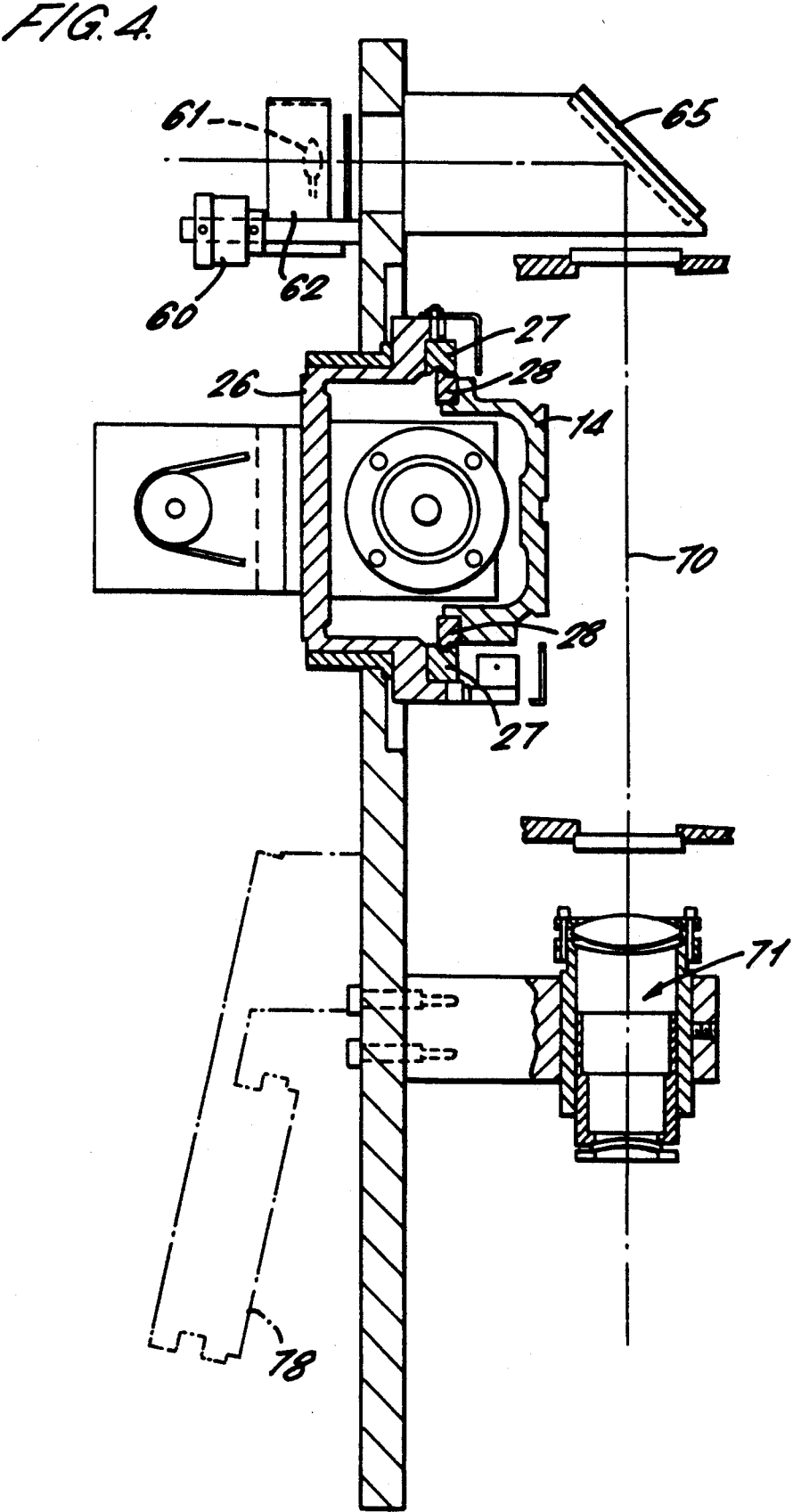
FIG. 4 is a section on the line 4—4 on FIG. 2.
Figure 5:
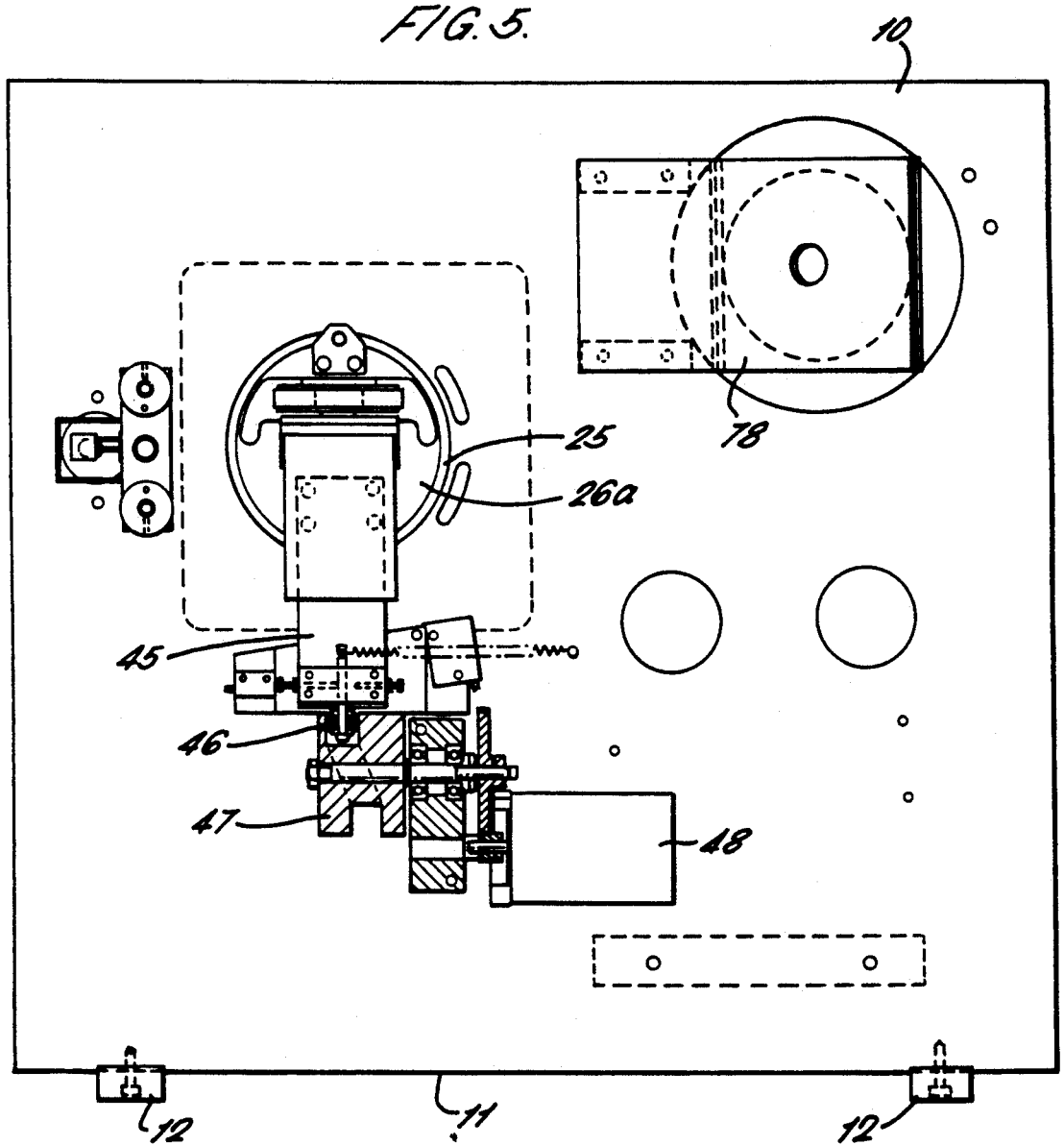
FIG. 5 is a view of the rearward side of the instrument with the rear housing removed to reveal the components of the instrument mounted on the rearward side of the base plate.
Figure 6:
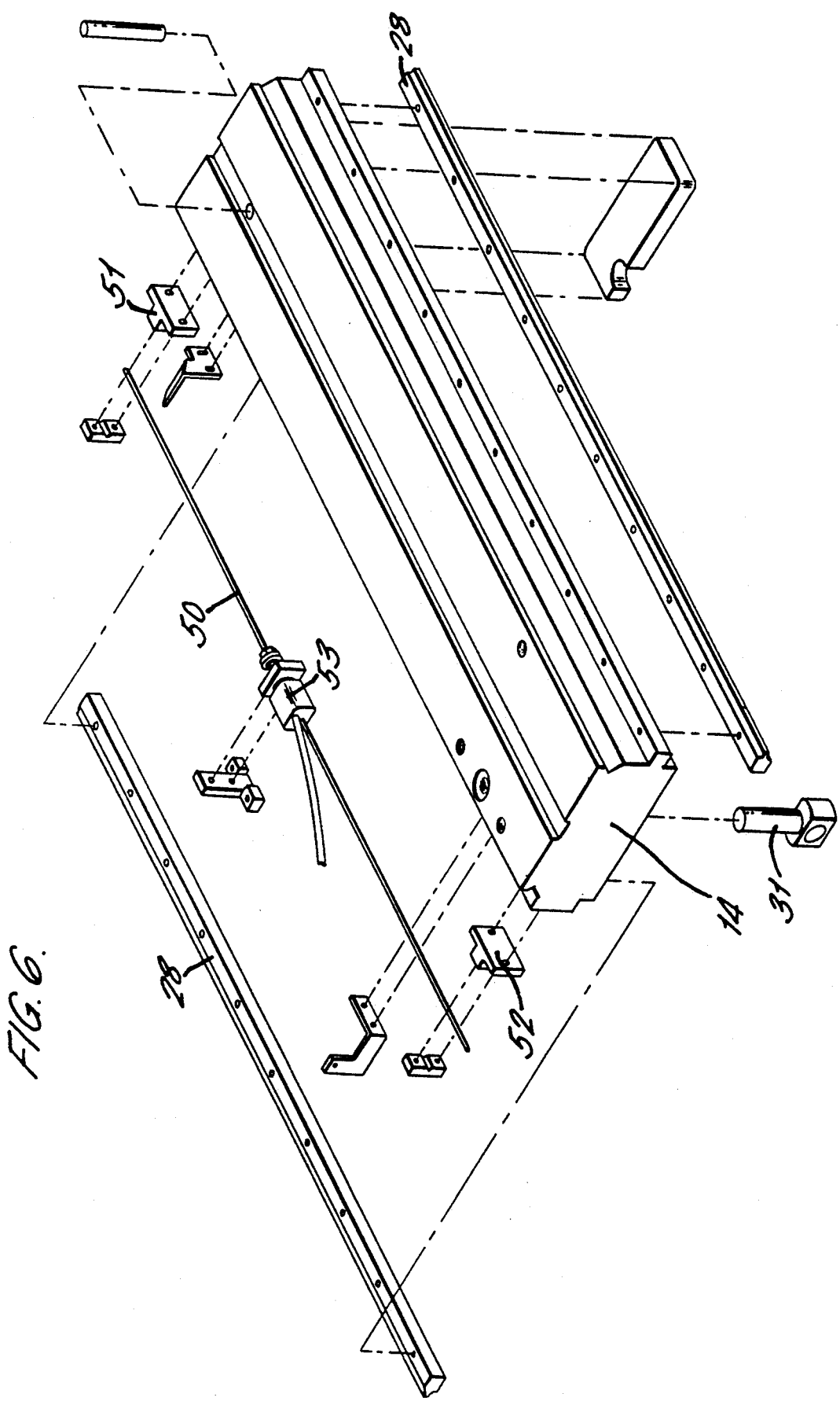
FIGS. 6 and 7 are exploded views of the component carriage and its associated drive mechanism.
Figure 7:
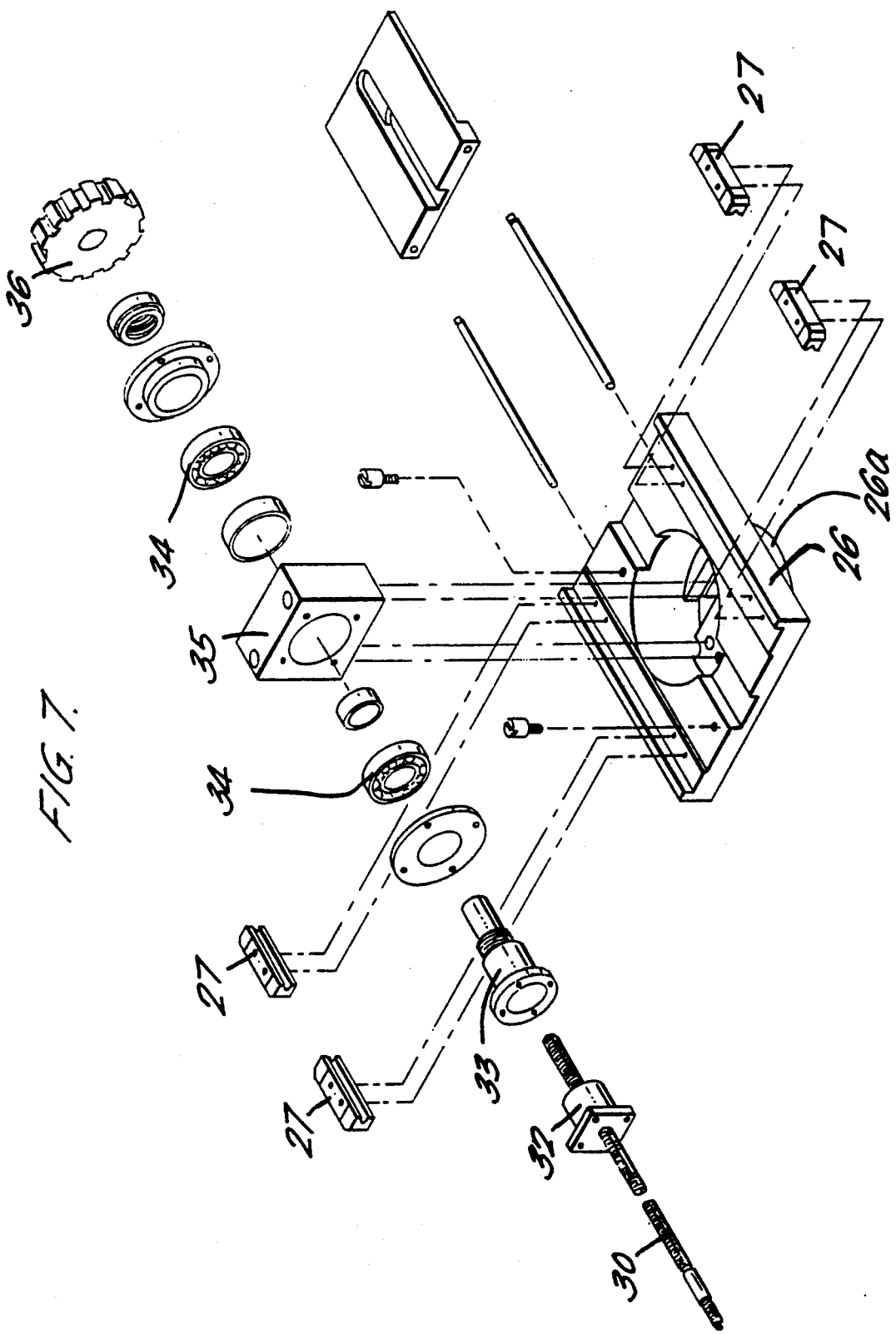
Figure 8:
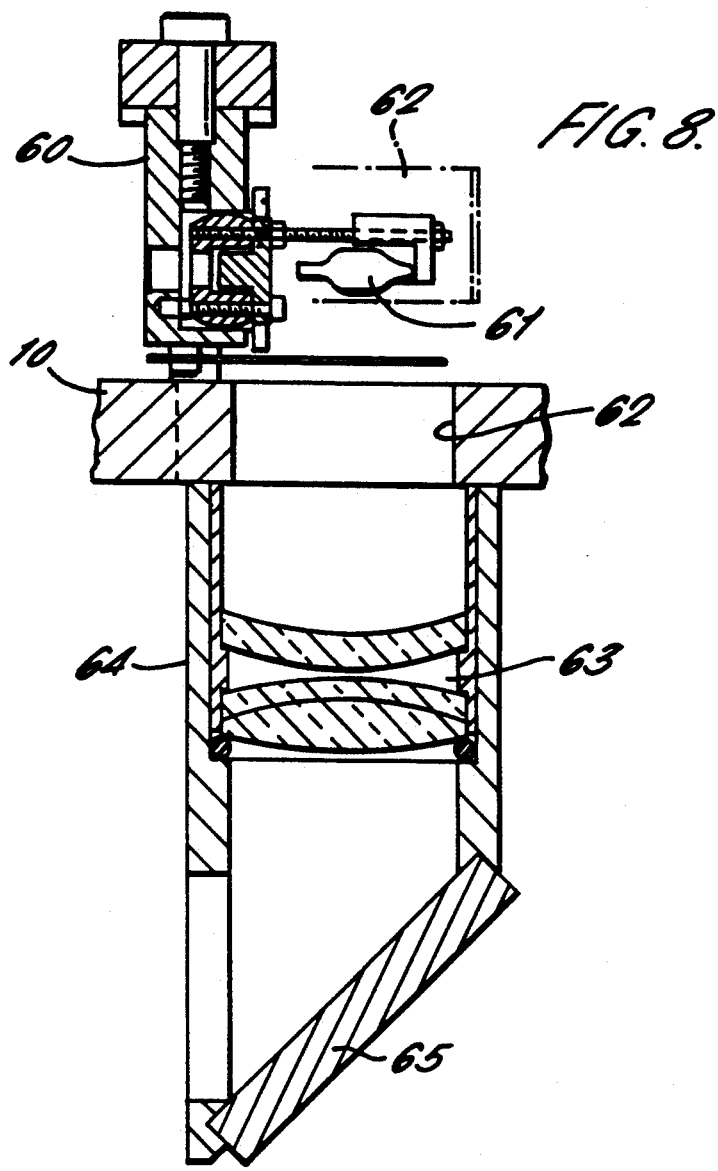
FIG. 8 is a detailed view of a light source, its mounting on the rear of the base plate and the optical arrangement for directing a beam of collimated light received from the light source across the front of the base plates through a measurement station.
Figure 9:
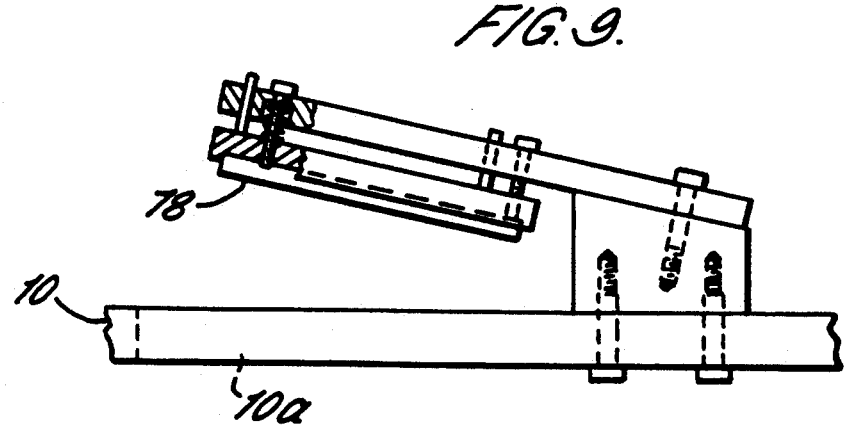
FIG. 9 is a detailed view of a mounting for a mirror on the rearward side of the base plate for reflecting an image of the part of the component being measured forwardly onto a back projection screen mounted in the front wall of the housing.

The instrument comprises an upright rectangular base plate 10 supported along its bottom edge 11 on a pair of spaced elongate feet 12 (see FIG. 2) which extend transversely of the plate to either side thereof to hold the plate upright on a horizontal support surface.

A forward side 13 of the plate has a vertically movable carriage 14 which is traversed in a vertical direction by a mechanism to be described later. The carriage 14 has vertically spaced component holders 15, 16 adjustably mounted thereon to receive and support an object to be measured centred on a measurement axis indicated at 9. The object is traversed by the carriage through a measuring station indicated at 17. It will be appreciated that different forms of object supports will be provided according to the form of component to be measured and the measurement required. In the arrangement illustrated, the lower holder 16 has a centre 16a to engage and support an end of the component, the centre being mounted in the holder for rotation and being tilted through a worm and wheel arrangement (not shown) driven by an electric motor 16b mounted on the holder disposed in a side casing 16a on the holder. To complement the motor driven lower holder, the upper holder 15 has a spring loaded centre (not shown) to engage and support the upper end of the component.

To one side of the carriage there is a vertically extending housing 18 enclosing components of a system for directing a beam of collimated light through the measuring station 17 to be interrupted by the component supported on the carriage, the light being emitted from an aperture 19 formed in a side wall of the housing 18 flanking the carriage. A further vertical housing 20 is mounted on the front wall of the plate on the opposite side of the carriage to the housing 18 and has an aperture to receive the residual light beam from the measurement station. The housing 20 encloses further optical components for splitting the beam of light received from the measurement station, part of the beam being directed to arrays of photo-electric devices from which the measurement of the object at the measuring station is computed and the remaining part of the beam being focussed onto a back-lit projection screen 21 mounted towards the upper end of the front of the housing 20 to provide a visual image of the part of the component being measured. The screen may have markings such as x and y axes thereon with the y axis corresponding to the measurement axis 9 on which the object is supported.

Further components of the system are mounted on the rearward side of the base plate 10 and are enclosed in a unitary housing 22 extending over the whole of the back of the base plate.

The mechanical and optical design of the instrument is such that the instrument can be used with the measurement axis vertical as illustrated in FIG. 1 or with the instrument laid on its side and the measurement axis horizontal. To cater for the latter, one side edge of the base plate 10 is provided with sockets to receive supplemental feet to support the instrument on its side. This enables objects which are not suitable to be supported between centres to be measured. By way of example, the carriage may be provided with a support on which a horizontal glass plate is mounted to receive an object to be measured for carrying the object through the measuring station.

Reference is now made to FIGS. 2 to 7 of the drawings which illustrate the mechanical and optical features of the instrument in greater detail. Firstly, the mounting of the carriage 14 and the mechanism for raising and lowering the carriage will be described. The carriage is mounted on a vertically extending channel section casting 26 having a hollow circular boss 26a formed on the base of the channel which is mounted in a corresponding circular aperture 25 in base plate 10 to allow the channel to be adjusted about a horizontal axis. Upper and lower pairs of slide blocks 27 are mounted at the mouth of the channel on either side thereof and the carriage 14 has elongate slideways 28 on either side thereof which engage the respective slide blocks to support the carriage for vertical sliding movement on the base plate.

A vertically extending lead screw 30 is mounted on the inner side of the carriage 14, the lower end of the lead screw being supported in a mounting 31 at the bottom of the carriage. The upper end of the lead screw engages in an internally threaded nut 32 mounted in the lower end of a hollow drive shaft 33 supported in upper and lower bearings 34 in a housing 35 secured to the the casting 26 in the hollow boss 26a.

The shaft 33 extends above the bearing housing and a tooth pulley 36 is secured to the upper end of the shaft and is engaged by a toothed belt 37 which extends through an aperture 38 in the casting 26 to a tooth pulley 39 mounted on the output shaft 40 of an electric drive motor 41 mounted on the outer side of the boss 26a. It will be appreciated that rotation of the motor in either direction rotates the nut 32 which results in the carriage 14 on which the component to be measured is mounted rising and falling with respect to the base plate.

The casting 26 is adjusted in its seating about a horizontal axis by means of a downwardly extending lever arm 45 attached to the boss 26a and having a cam follower 46 at its lower end which engages in a spiral cam 47 rotatively driven by a further drive motor 48 mounted on the back of the base plate 10 for rotating the lever arm 45 and thereby adjusting the alignment of the casting in the aperture in the base plate particularly for thread measurement to allow alignment of the helix with the optical axis.

In order to determine accurately the vertical position of the carriage 14, a linear transducer can be provided comprising, for example, an elongate rod 50 secured to one side of the carriage between upper and lower mountings 51, 52 and engaging a transducer 53 responsive to movement of the member through the transducer to provide a signal to indicate the position of the carriage.

Having described the main mechanical aspects of the instrument, the optical components of the instrument will now be described.

On a part of the base plate 10 behind the housing 18 a mounting arrangement 60 is provided for a bulb 61 including a separate jig 62 in which the bulb is intially loaded out of the instrument and is then subsequently installed in the mounting 60. The base plate 10 is provided with an aperture 62 through which light from the bulb passes forwardly and is collimated into a parallel beam by means of a double lens unit 63 mounted in a lens holder 64. The collimated beam of light is directed at a 45 degree angled mirror 65 mounted on the front wall of the housing to direct beam of light horizontally across the front wall of the housing out of the aforesaid aperture 19 of the housing and through the measurement station 17.

Light from the bulb 61 is directed by the mirror 65 along a main optical axis 70 of the instrument through the measuring station in which a portion of the object to be measured is supported by the platform and then through a window (not shown) in the side wall of the housing 20 and through a projection lens assembly 71 to form images of the illuminated part of the component on the photo-electric array means and screen respectively as indicated earlier.

Figure 10:
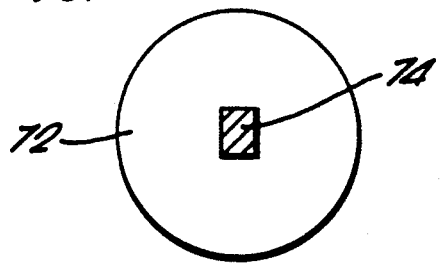
FIGS. 10, 10a and 11 to 14 illustrate diagrammatically various light stop arrangements embodied in the instrument.
Figure 11:
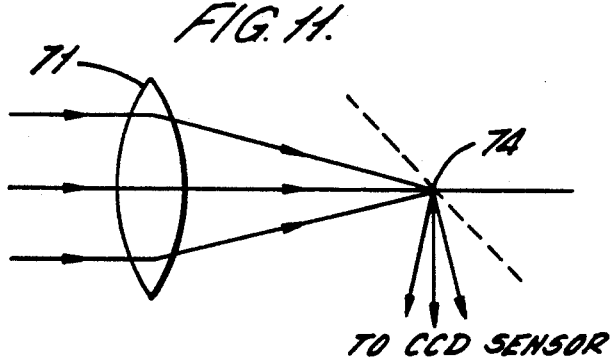
Figure 12:
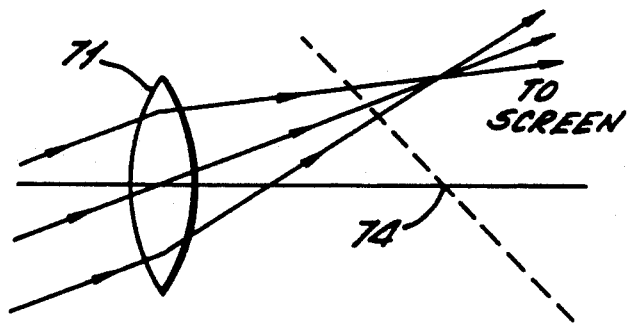
Figure 13:
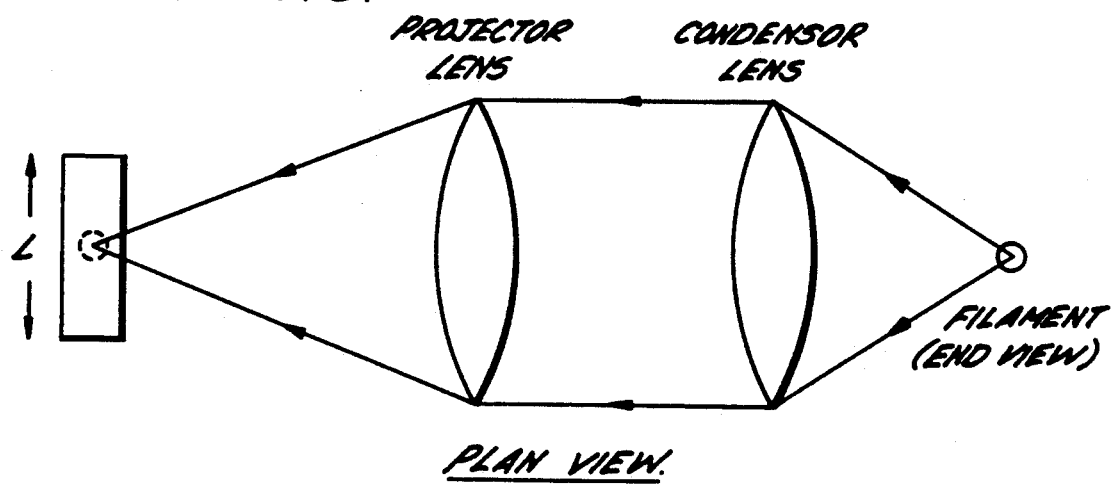
Figure 14:
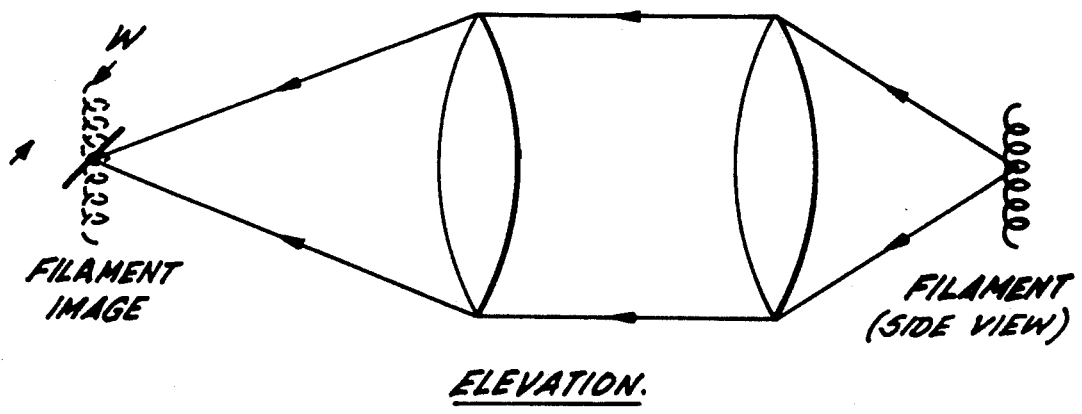

The next component along the optical axis 70 from the projection lens 71 is an angled glass plate 72 having a central reflecting stop and mounted in a holder 73. The glass plate 72 is illustrated in FIG. 10 of the drawings and, as can been seen, is of circular form having a small rectangular reflecting stop 74 at its centre. The projection lens 71 focusses the collimated beam of light received from the measuring station onto the reflecting stop 74 as illustrated in FIG. 11 to reflect the resulting beam downwardly towards the CCD arrays. Non-parallel light from the lens assembly 71 passes through the glass plate 72 around the reflecting stop 74 as shown in FIG. 12 and thence via mirror 75, lens 76 and mirror 77 which reflects a focussed image through a circular aperture 10a in base plate 10 to a mirror 78 mounted on the back of base plate 10. Mirror 78 reflects the image back through aperture 10a and onto the back projection screen 21a at the front of the housing 20. The mirrors are aligned so that a non-inverted image of the component as illuminated in the measuring station and reflected onto the screen can be seen by the instrument user. The mirror 78 is adjustably mounted on the back of base plate 10 to allow the image to be centred on the screen with respect to the markings thereon. The preferred geometry for the stop 74 is a rectangular shape oriented relative to the illuminating lamp filament as shown in the accompanying FIGS. 13 and 14.

The absolute values for length (L) and width (W) of the stop depend on the detailed design of the system but the criteria for choice are:

LENGTH: The maximum value for length is fixed by the requirement that the stop, rather than other components such as lenses, should define the aperture of the optical system in order to minimize variations in image size with variations in component position. The stop is chosen to be near this value to allow the maximum diffracted light through to obtain the best possible edge definition in the image of component radial surfaces and also to reduce illumination filament alignment requirements.

WIDTH: The width is a balance between the choice of a large value which increases illumination on the CCD arrays (which in turn increases the speed of measurement) and a small value which increases the illumination on the projector screen and allows a greater tolerance on angular alignment of the component without causing errors in measurement of component faces.

Figure 10A:
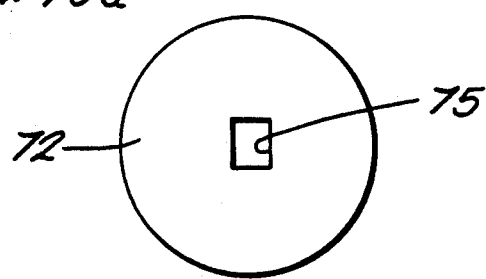

Alternatively, the stop 74 can be a light transmitting portion (75) of a circular mirror to allow alternative arrangements of projector screen and CCD arrays (FIGS. 10a).

Towards the lower end of the front plate 10, below the glass plate 73, there are two elongate arrays 80 of photo-detectors in the form of CCDs mounted on PCB boards 81 in transversely extending planes with a beam splitter 82 mounted at 45 degrees between the arrays. The arrays are located a short distance from one end of their respective boards and extend the full width of the boards.

It will be appreciated that the presence of a component at the measuring station will obstruct the path of the light beam along the optical axis leaving a portion of the beam to pass along the optical axis. This portion of the light beam is focussed by the projection lens 71 onto the reflecting stop 74, one portion of the beam being reflected directly onto the one array and the other portion of the beam being reflected by a 45 degree beam splitter onto the other array.

The outputs from the CCD arrays are analyzed by a micro-processor or computer system to derive a dimension for the corresponding part of the component in the measuring station.

The CCD or photo-electric arrays are arranged at an angle (approximately 5 degrees) to the normal to the component axis 9 to allow high resolution edge measurement without requiring high resolution stepping of the axial position. The outputs from the arrays are analyzed to enhance the resolution to better than one pixel. This arrangement results in a better range/resolution ratio and faster scanning of the arrays.

It will be appreciated that the arrangement of a pair of arrays extending transversely to one another with a beam splitter between them provides a conveniently compact arrangement. It is however possible to have a single long array on which the beam is focussed.

I claim:

1. An electro-optical measurement apparatus comprising, a measurement station, a light source on one side of the measurement station, means to direct a beam of collimated light from the light source along an optical path through the measurement station, photo-detector array means disposed in the optical path from the measurement station, means to support an object to be measured at the measurement station in said optical path to block part of the light beam from the light source leaving transmitted portions of the beam to reach and activate corresponding sections of said array means, means to derive the dimension of the object in the optical path from the resulting activation of the array means, a screen, and an optical device on which light from the measurement station is incident having one area which directs light to the array means and another area which directs light to the screen, wherein the improvement comprises providing means to focus parallel light from the measurement station onto said one area of the optical device for directing said light onto the array means and providing further focussing means for focussing non-parallel light directed from the optical device onto said screen to create an image of the object being measured in the measurement station on the screen.

2. A measurement apparatus as claimed in claim 1, wherein the optical device transmits non-parallel light from the measurement station to said further focussing means for focussing an image of the object of the measurement station onto the screen and has reflecting stop means onto which said first focussing means focuses parallel light for reflecting the light onto the array means.

3. An apparatus as claimed in claim 1, wherein the optical device comprises a mirror having an aperture, the mirror directing non-parallel light from the measurement station to the further focussing means for focussing the light onto the screen to create an image of the object being measured on the screen and an aperture in the mirror on which parallel light from the measurement station is focussed by said first focussing means to pass to the array means.

4. A measurement apparatus as claimed in claim 2, wherein the reflecting stop means is mounted on a glass plate disposed in the optical path from the measurement station and at an angle to the path to reflect light focussed onto said stop means onto the array means and to pass non-parallel light from the measurement station to said means to focus the light onto the screen.

5. A measurement apparatus as claimed in claim 2, wherein said photo-detector array means comprise one or more elongate arrays each comprising a multiplicity of photo-electric devices and arranged to receive respectively said transmitted portions of the beam of light from said beam dividing means.

6. A measurement apparatus as claimed in claim 5, wherein two arrays are provided one of which arrays is arranged to receive part of the beam of light from the reflective stop directly and a further reflector is provided to reflect the remainder of the beam onto the other array.

7. A measurement apparatus as claimed in claim 5, wherein the elongate arrays extend at a small angle to a measurement axis which generally extends in a direction which is aligned along the arrays to provide rapid edge measurement.

8. A measurement apparatus as claimed in claim 1, wherein the means to focus said beam of light onto the screen is arranged to focus a magnified image of the portion of the object being measured in the measuring station onto the screen.

9. A measurement apparatus as claimed in claim 1, wherein the screen is provided with a marking corresponding in position to a notional center line drawn through the measurement station to enable the position of the object in the measurement station as seen on the screen to be checked for cleanliness and adjusted for focus.

10. A measurement apparatus as claimed in claim 1, wherein said light source comprises a bulb mounted in an adjustable jig which can be pre-set to locate the bulb automatically in the correct focussed position.

11. A measurement apparatus as claimed in claim 1, wherein the means to support the object to be measured in the measurement station comprise a carriage for the object mounted on a slideway for movement of the carriage transversely of the optical path from said light source and means are provided for traversing the carriage along the slideway to move the object to be measured through the measuring station to allow measurements to be taken at a plurality of locations along the length of the object.

* * * * *